US012741605B2

(12) United States Patent
Valembois

(10) Patent No.: US 12,741,605 B2
(45) Date of Patent: Sep. 22, 2026

(54) SACRIFICIAL COMPOSITE PART THAT ABSORBS ENERGY DURING A VEHICLE COLLISION

(71) Applicant: HUTCHINSON, Paris (FR)

(72) Inventor: Guy Valembois, Lauzerville (FR)

(73) Assignee: HUTCHINSON, Paris (FR)

( * ) Notice: Subject to any disclaimer, the term of this patent is extended or adjusted under 35 U.S.C. 154(b) by 319 days.

(21) Appl. No.: 18/288,071

(22) PCT Filed: Apr. 26, 2022

(86) PCT No.: PCT/EP2022/061096
§ 371 (c)(1), (2) Date: Oct. 24, 2023

(87) PCT Pub. No.: WO2022/229216
PCT Pub. Date: Nov. 3, 2022

(65) Prior Publication Data
US 2024/0208447 A1 Jun. 27, 2024

(30) Foreign Application Priority Data
Apr. 27, 2021 (FR) ...................................... 2104352

(51) Int. Cl.
*B60R 19/22* (2006.01)
*B60R 19/34* (2006.01)

(52) U.S. Cl.
CPC .............. *B60R 19/22* (2013.01); *B60R 19/34* (2013.01)

(58) Field of Classification Search
CPC ........... B60R 19/34; B60R 19/22; F16F 7/121
(Continued)

(56) References Cited

U.S. PATENT DOCUMENTS 3,933,387 A * 1/1976 Salloum .................. B60R 19/18 267/140
4,029,350 A * 6/1977 Goupy ..................... B60Q 1/26 293/133

(Continued)

FOREIGN PATENT DOCUMENTS

CN 104890604 A * 9/2019
EP 1 607 272 A1 12/2005

(Continued)

OTHER PUBLICATIONS

International Search Report and Written Opinion for corresponding PCT Application No. PCT/EP2022/061096, mailed Jul. 28, 2022 (5 sheets).

*Primary Examiner* — Joseph D. Pape
(74) *Attorney, Agent, or Firm* — Womble Bond Dickinson (US) LLP

(57) ABSTRACT

The invention relates to a sacrificial composite part (1, 10, 100) that absorbs the energy released at the time of a vehicle collision with an impacting object (2), said part consisting of an assembly of a plurality of cells (3, 30, 300), each cell comprising a wall (5, 50, 500) connecting a first end (6, 60, 600) and a second end (7, 70, 700) of said cell, the direction of penetration (8) of the impacting object into said part going from said first end to said second end. Said sacrificial composite part of the invention is characterized in that that peripheral wall of each cell has a decreasing thickness (e) from said first end towards said second end of said cell, in the direction of penetration of the impacting object.

6 Claims, 6 Drawing Sheets

(58) Field of Classification Search
USPC .......................................................... 293/133
See application file for complete search history.

(56) References Cited

U.S. PATENT DOCUMENTS

| | | | | |
|---|---|---|---|---|
| 6,443,513 | B1 * | 9/2002 | Glance .................... | B60R 21/04 428/116 |
| 6,637,786 | B2 * | 10/2003 | Yamagiwa ............... | B62J 23/00 293/105 |
| 8,348,032 | B2 | 1/2013 | Jacob et al. | |
| 8,608,232 | B2 | 12/2013 | Engertsberger et al. | |
| 10,220,881 | B2 * | 3/2019 | Tyan ....................... | B32B 15/08 |
| 2003/0030290 | A1 | 2/2003 | Yamagiwa | |
| 2017/0072884 | A1 | 3/2017 | Zannier | |
| 2019/0263342 | A1 | 8/2019 | Rodgers et al. | |

FOREIGN PATENT DOCUMENTS

| | | | |
|---|---|---|---|
| EP | 2 371 677 | A1 | 10/2011 |
| FR | 2 960 838 | A1 | 12/2011 |

* cited by examiner

[Fig. 1]
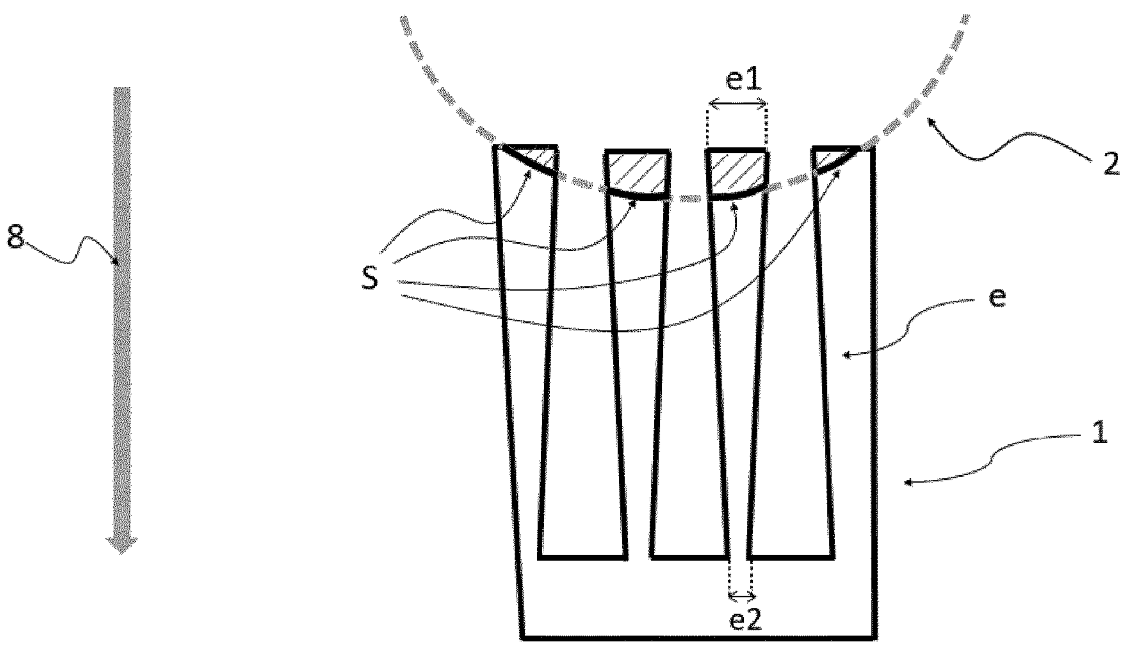
[Fig. 2]
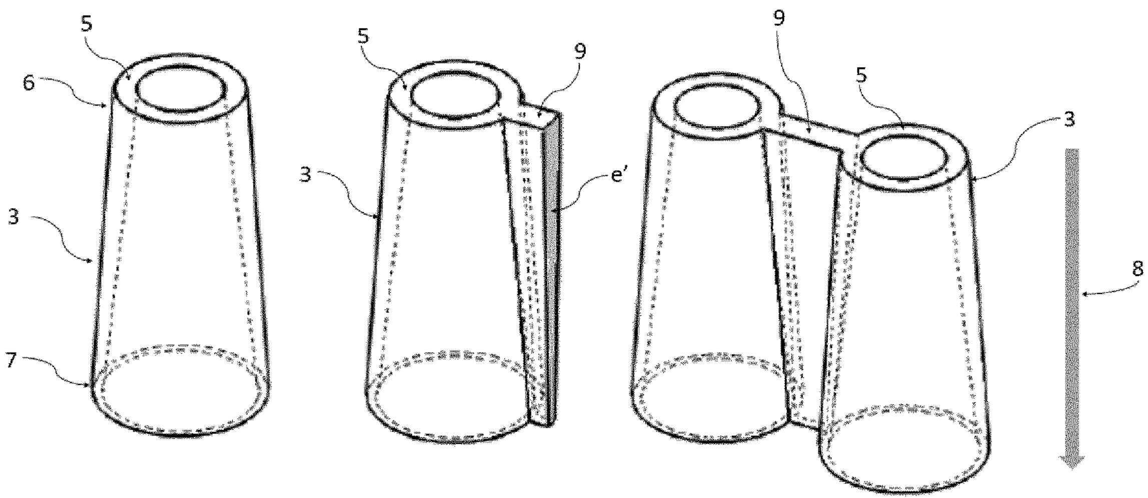

[Fig. 3]
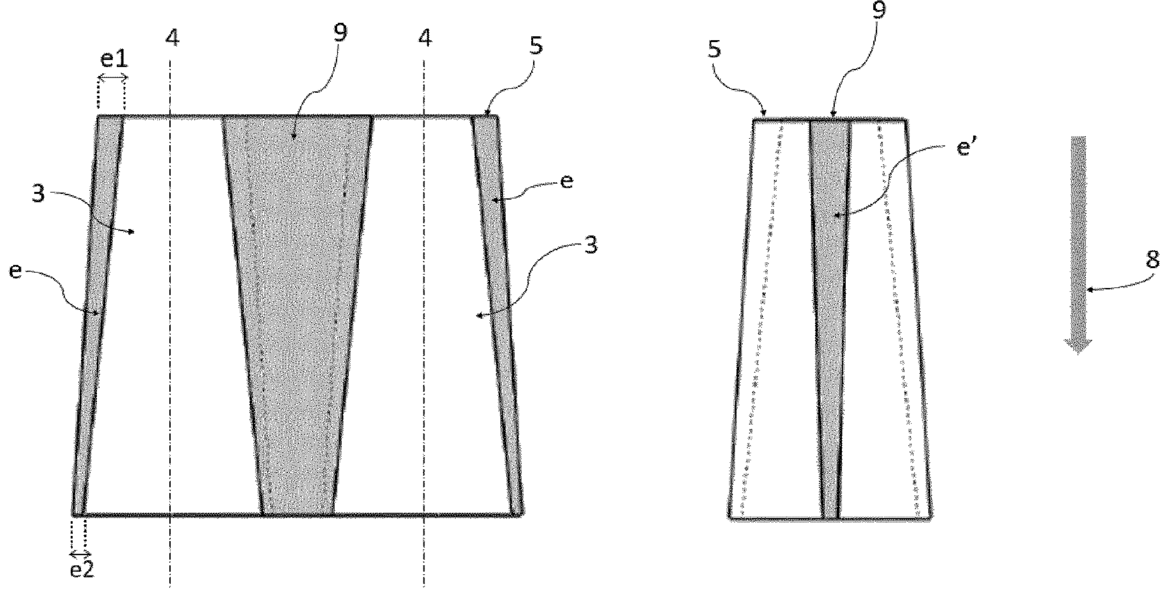
[Fig. 4]
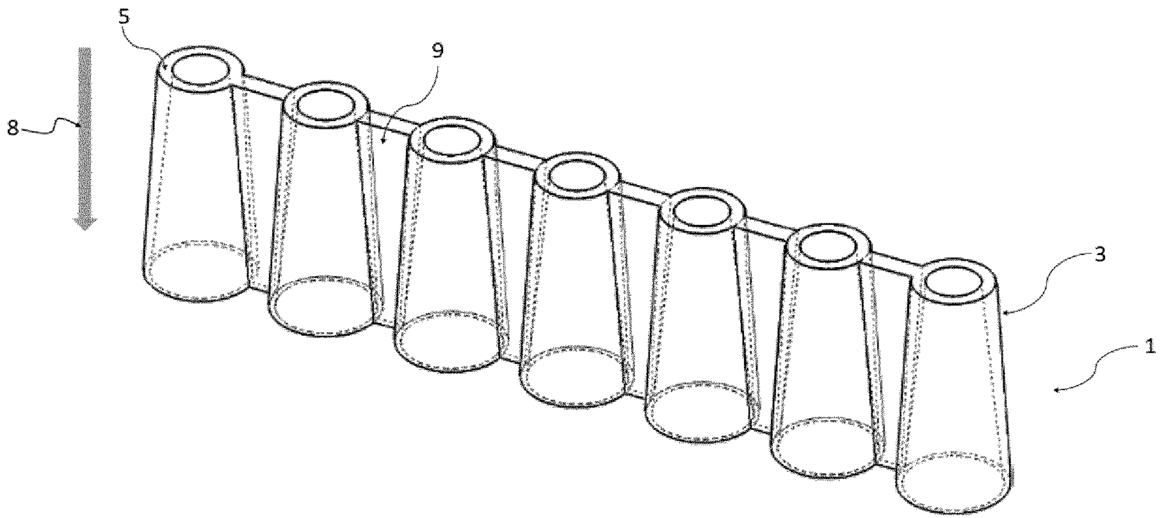

[Fig. 5]
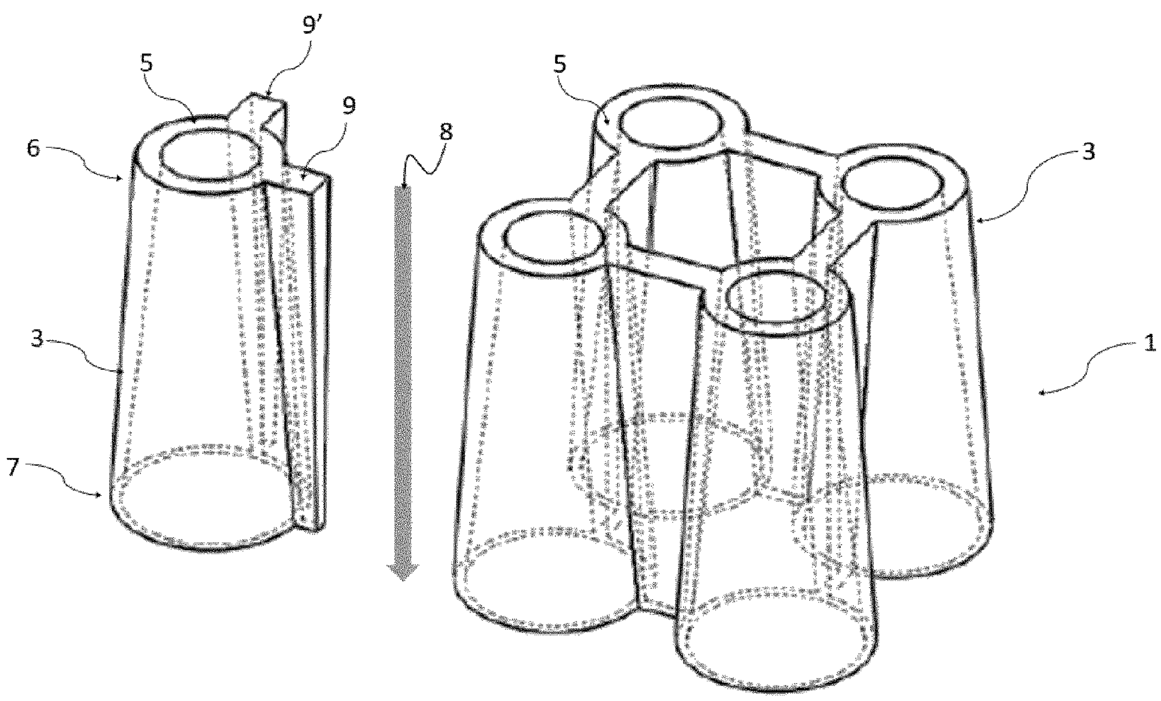
[Fig. 6]
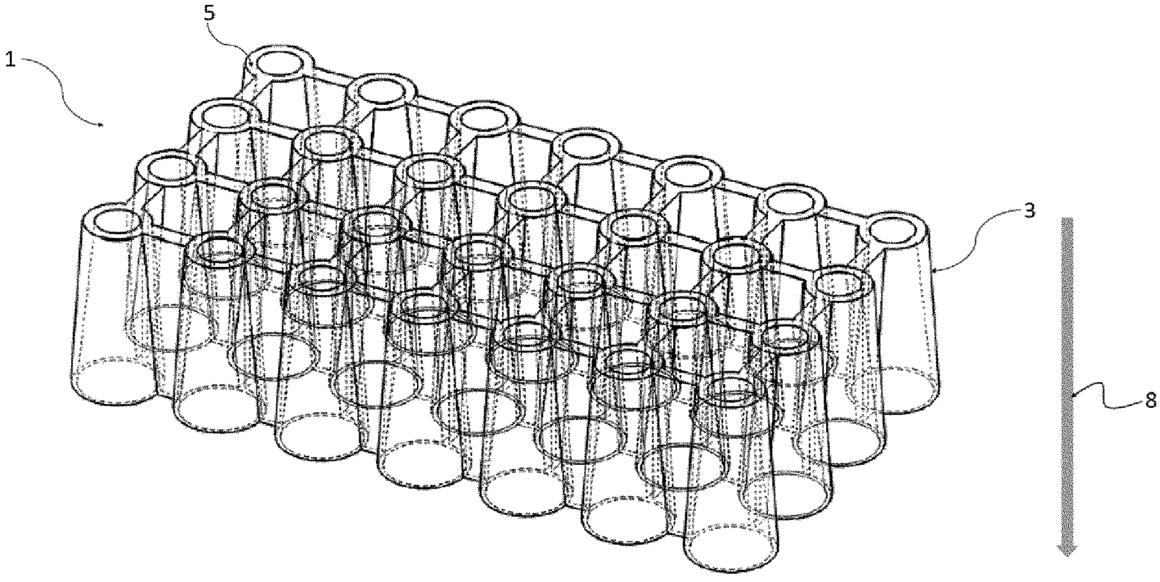

[Fig. 7]
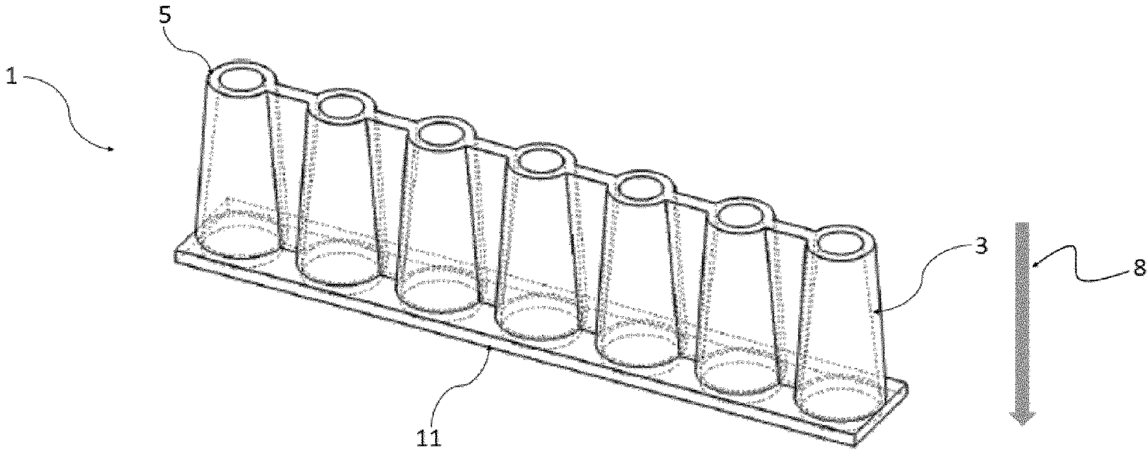
[Fig. 8]
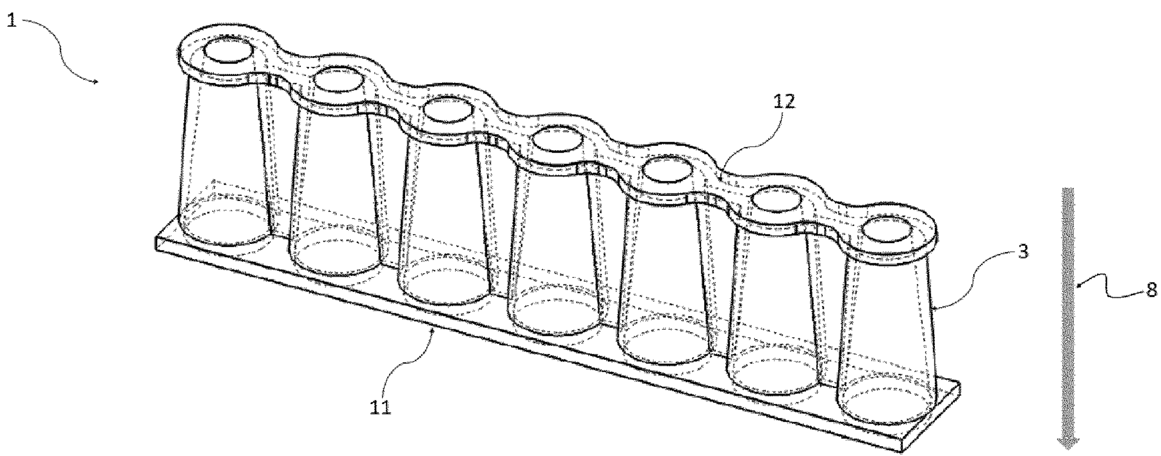
[Fig. 9]
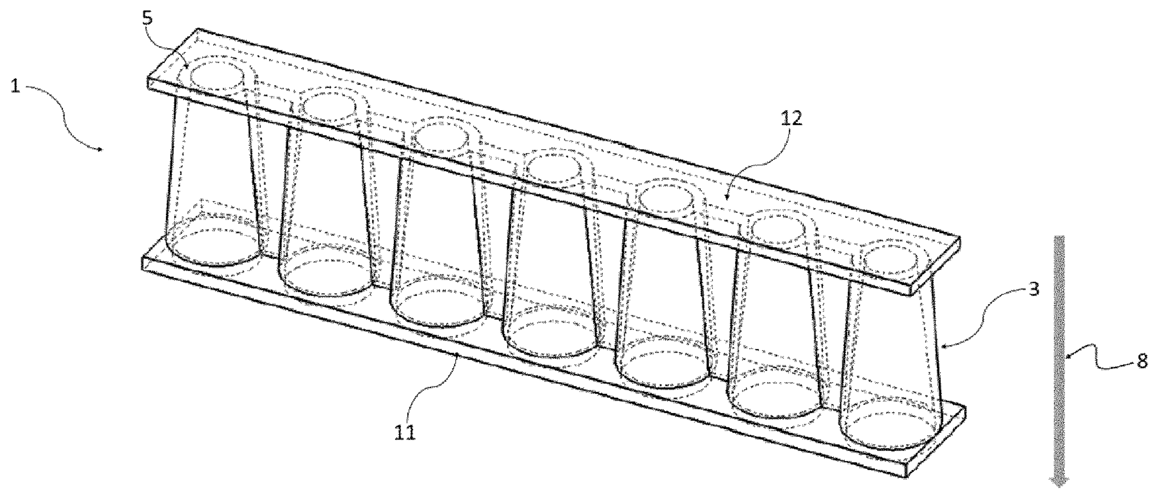

[Fig. 10]
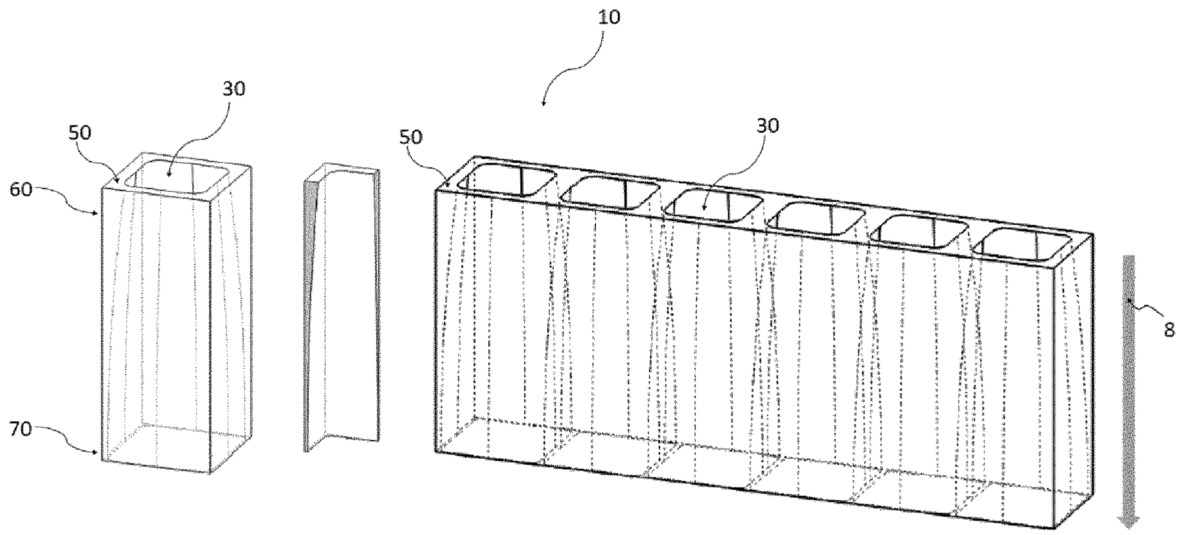
[Fig. 11]
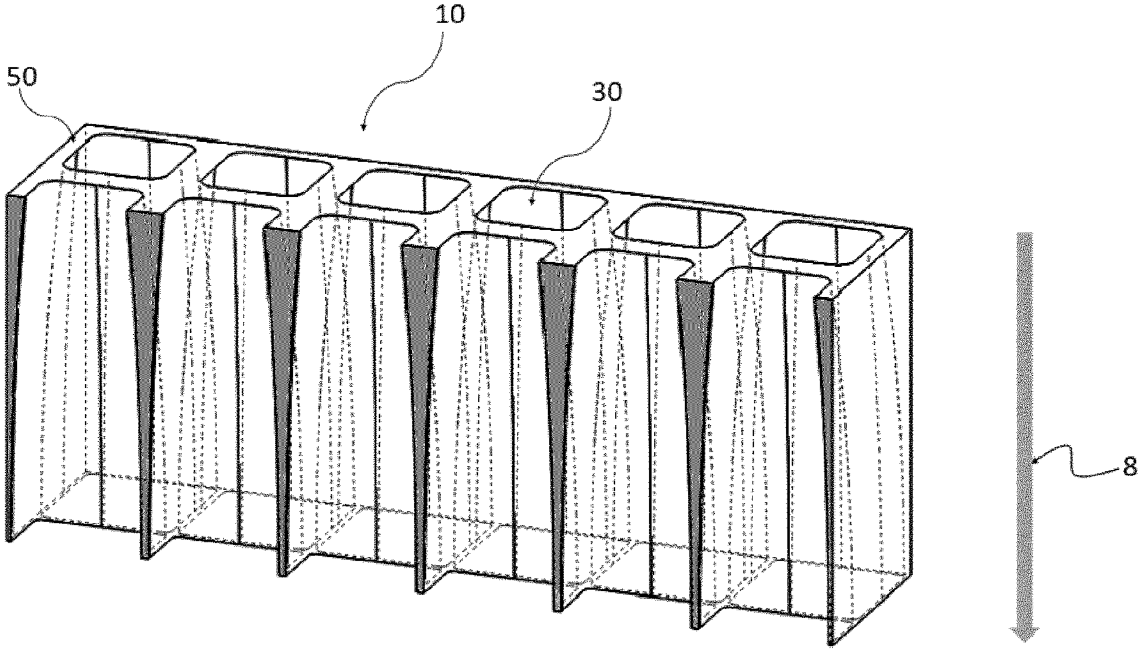

[Fig. 12]
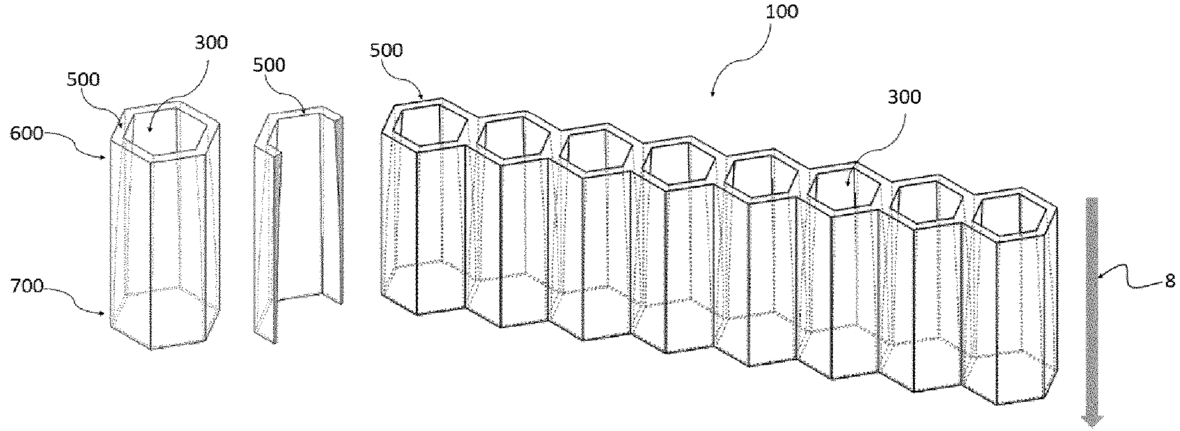
[Fig. 13]
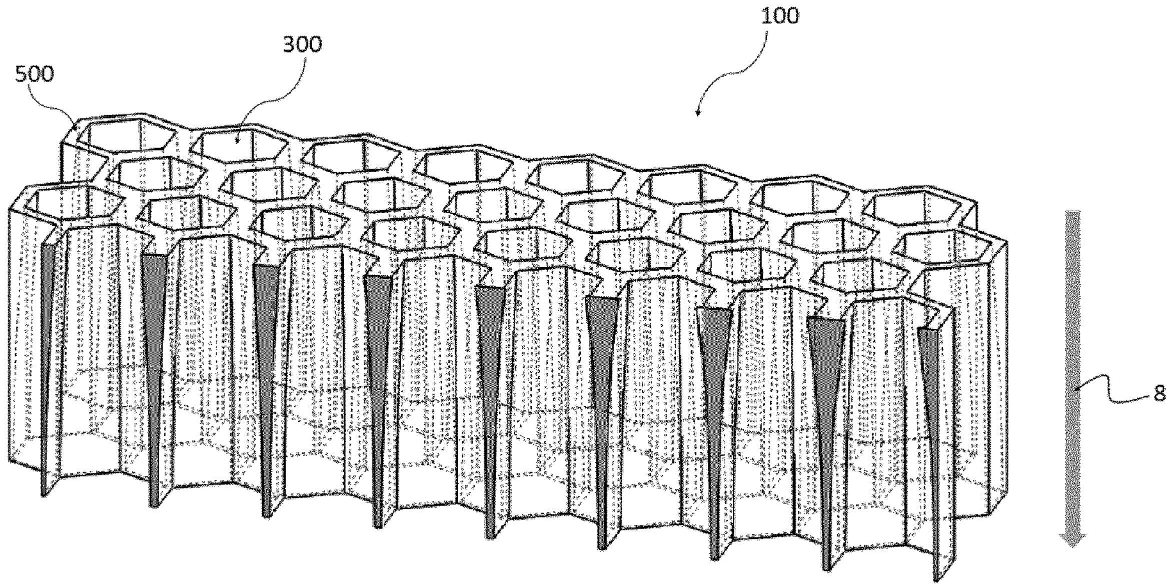

SACRIFICIAL COMPOSITE PART THAT ABSORBS ENERGY DURING A VEHICLE COLLISION

CROSS-REFERENCE TO RELATED APPLICATIONS

This application is a U.S. National Phase Patent Application and claims priority to and the benefit of International Patent Application No. PCT/EP2022/061096, filed on Apr. 26, 2022, which claims priority to French Patent Application No. FR2104352, filed on Apr. 27, 2021. The entire contents of each of which are incorporated herein by reference.

The present invention relates to a composite part intended to be a sacrificial element that absorbs the energy released when a vehicle collides with any obstacle.

At the time of a collision, or crash, of a vehicle with an object, the function of the part that allows to protect the people and/or the objects inside the vehicle consists of being the sacrificial element that allows the localisation of the damage resulting from said collision outside the area to be protected, while limiting the dynamic effects endured by the people and/or objects to be protected.

The penetration of a body into the sacrificial composite part that absorbs the energy takes place under a penetration force that evolves during the damage resulting from the collision.

The law of evolution of the force during the displacement is an essential characteristic of the sacrificial composite part.

In fact, the force generated when said part collapses at the moment of a collision translates into acceleration for the people enduring the collision or into force for the objects that we wish to protect.

On the other hand, the depth of penetration of the body into the part is always limited by overall dimension constraints.

This is how $\eta$ is the efficiency of a crash control system. This efficiency $\eta$ corresponds to the percentage ratio between E, which is the energy absorbed by the sacrificial part during the crash, and Ei, which corresponds to the energy that could ideally be absorbed by a theoretical sacrificial part.

The energy absorbed is directly the integral of the effort during the displacement, i.e. the surface area under the Effort-Displacement curve. The efficiency $\eta$ of a crash control system is therefore directly the ratio of the surface areas under the curve E representing the energy actually absorbed and Ei, the energy that could ideally be absorbed.

For a given maximum force F maxi and a maximum displacement d maxi, the theoretical energy that can ideally be absorbed is Ei=F maxi*d maxi.

In the current prior art, we know of assemblies that absorb the energy in the event of a vehicle crash, with constant collapse cross-sections in the form of juxtaposed cells, which may be of circular or hexagonal types. Such devices may also be referred to as “crush assemblies”.

These assemblies can be made from metallic materials, in particular aluminium or steel.

Assemblies of aluminium cells are known to form peripheral protection elements that protect the batteries of an electric vehicle in the event of a collision.

The principle of energy absorption in this type of assembly is the longitudinal folding of the cells that make it up.

However, the disadvantage of such assemblies is that they result in a folded final shape with an overall dimension that leads to a reduction of the stroke by around a third.

Another disadvantage of these assemblies is that the force response for a cylindrical impactor increases sharply during the impact, due to the increase in the contact surface between the impactor and the impacted structure, which ultimately results in a very low energy efficiency.

Also known from the patent document US 2019/263342 is an energy-absorbing assembly of the type described above, for a vehicle, comprising a compartment incorporating a plurality of unitary energy-absorbing elements made from a polymer and reinforcing fibres.

Each of these elements of the assembly is formed by an elongated cylindrical hollow structure extending between a first end and a second end, the structure being circular in cross-section, thus forming an assembly of frustoconical cells.

In this absorption assembly, the cylindrical hollow structure of each cell of the assembly can be defined by a first diameter at the first end of said structure, and by a second diameter at the second end thereof, said second diameter being able to be smaller than said first diameter, while the second end is arranged outside the first end with respect to the vehicle.

In other words, in the event of a collision, the second end of the cells, which has a smaller diameter than the first end, is crushed before the first end of the cells is also crushed, so the impact propagates from the second end of the cells towards the first end of it.

It should also be noted that the thickness of the wall of the frustoconical cells can be variable along the longitudinal axis of said cells. In this case, at the level of the first end of the cell, the latter have a thickness greater than the thickness of the second end at the level of which the crushing is initiated in the event of a collision. Also, in this hypothesis where the thickness is variable, decreasing from the first end towards the second, the diameter of the cell increases from the first towards the second end of the cell, where the impact is initiated.

However, such a solution presents the risk of a rupture of the wall of the cells, either at the level of the area of contact with the impacting body, or at the level of the root of the cell. In addition, the flexural hold of the cells can be further improved.

One of the aims of the present invention is to offer a sacrificial composite part that absorbs the energy during an impact, with an improved efficiency compared with current devices.

The sacrificial composite part according to the present invention thus allows to significantly increase the crash energy that can be absorbed, in the limitation of the penetration travel and under a maximum force limit that must not be exceeded.

More specifically, the aim of the present invention is to propose a solution in the form of a sacrificial composite part capable of optimising the efficiency of its behaviour during a collision or a crash, particularly in the automotive scope, where one of the most penalising interactions for the people or objects takes place with fixed posts or trees during the collisions.

One of the purposes of the present invention is to allow to produce such a part for the protection of the batteries, in the battery packs, in electric vehicles, without this purpose limiting the invention.

The interaction between an impacted structure (automobile) and an impactor body of generally cylindrical shape (in the form of a fixed shaft or a fixed post) is such that at the very start of contact, at the moment of the collision between the two elements, the common surface area between said cylindrical body and the structure is very limited, before this common surface area increases progressively as the impactor element sinks into the impacted structure.

This specific interaction between the two elements gives rise to a law of force evolution as a function of penetration, which increases sharply, resulting in a very low efficiency η, of the crash control system, in other words, very little energy absorbed by the impacted structure.

In order to improve this efficiency in particular, the present invention proposes embodiments allowing for controlling the penetration force of the impactor body into the sacrificial composite part, which must be maximum while remaining as constant as possible throughout the duration of the impact, despite the specific nature of the impactors used for the crash tests, which are cylindrical.

To this end, the present invention relates more particularly to a sacrificial composite part absorbing the energy released when a vehicle collides with an impacting object, said part consisting of an assembly of a plurality of cells, each cell comprising a wall connecting a first end and a second end of said cell, the direction of penetration of the impacting object into said part extending from said first end towards said second end.

Said part in accordance with the invention is characterised in that the peripheral wall of each cell has a thickness (e) decreasing from said first end towards said second end of said cell, in the direction of penetration of the impacting object.

According to particular embodiments:

- each of the cells making up the sacrificial composite part of the invention has an internal cross-section whose surface area increases from said first end towards said second end of said cell, in the direction of penetration of the impacting object;
- the cross-section of the cells is circular overall; in this case, advantageously, each cell of circular cross-section of the assembly is connected to at least one adjacent cell by means of a connecting element in the form of a partition, the thickness (e') of which decreases in the direction of penetration of the impacting object;
- the cross-section of the cells is polygonal, preferably square or rectangular, or hexagonal;
- the composite part comprises a lower sole considering the direction of penetration of the impacting object and/or a connecting bar overhanging the cells in the direction of penetration of the impacting object.

Other aims and advantages of the present invention will become apparent in the course of the following description, which refers to embodiments that are given only as indicative and non-limiting examples.

This description will be easier to understand if reference is made to the attached drawings in which:

FIG. 1 shows, schematically and in cross-section, the penetration of an impacting object of generally cylindrical shape into a composite sacrificial part according to the invention, comprising a plurality of cells, each cell comprising a first end and a second end connected together by a wall whose thickness decreases in the direction of penetration of the impacting object into said part, this direction of penetration being symbolised by an arrow in the figure;

FIG. 2 illustrates schematically and in perspective, on the one hand, on the left of this figure, a particular embodiment of a unitary cell which can make up the sacrificial part of the invention, said cell having a substantially circular cross-section and a peripheral wall, shown in dotted lines, the thickness of which decreases in the direction of penetration of the impacting object symbolised by an arrow, on the other hand, in the centre of the figure, the same cell with a portion of a connecting element to a second cell, the thickness of which is shown decreasing in the direction of penetration of the impacting object, and also, on the right of the figure, a module comprising two unit cells connected together by a connecting element;

FIG. 3 shows a schematic view of the module shown on the right in FIG. 2, comprising two cells connected together by a connecting element, using cross-sections in the two planes of symmetry;

FIG. 4 illustrates schematically and in perspective a first particular embodiment of a composite part, formed by the association of a plurality of unitary cells whose cross-section is substantially circular, arranged, in a first variant, in the form of an elongate beam, two adjacent cells being connected together by a connecting element;

FIG. 5A illustrate schematically and in perspective a particular embodiment of a unitary cell which can make up the part of the invention comprising two portions of connecting element arranged in orthogonal directions (on the left of the figure), the thickness of the peripheral wall of the cell and of the connecting element always decreasing in the direction of penetration of the impacting object, and, on the right of the figure, a module made up of four of these unit cells connected together, each cell being connected to the two cells adjacent to it by two connecting elements positioned in orthogonal planes;

FIG. 6 illustrates schematically and in perspective a second variant of a composite part formed by the combination of a plurality of cells whose cross-section is substantially round, arranged so as to form a rectangular box whose length and width can vary;

FIG. 7 illustrates schematically and in perspective a sacrificial composite part in the form of an elongated beam similar to that shown in FIG. 4, with a lower sole added to it, considering the direction of penetration of the impacting object;

FIG. 8 illustrates schematically and in perspective a sacrificial composite part similar to that of FIG. 7 and additionally incorporating a connecting bar overhanging the cells in the form of a plurality of linearly adjoining annulus, one annulus overhanging one cell, according to a first example of embodiment;

FIG. 9 illustrates schematically and in perspective a sacrificial composite part similar to that of FIG. 7 and also incorporating a connecting bar overhanging the cells, said connecting bar being rectangular in shape, according to a second example of embodiment;

FIG. 10 illustrates schematically and in perspective, on the left of the figure, of a unitary cell of generally square cross-section, associated with other similar cells so as to form a second particular embodiment of a sacrificial composite part, a first variant of which, in the form of a rectilinear beam, is shown on the right of the figure, formed by the association of a plurality of juxtaposed cells whose cross-section is generally square, and whose peripheral wall thickness decreases in the direction of penetration of the impacting object, as illustrated in the cross-section of the unitary cell in the centre of the figure;

FIG. 11 schematically illustrates a cross-section of a second variant of the second embodiment of a sacrificial composite part of the invention, the latter comprising a plurality of rectilinear beams, one of which is shown in FIG. 10, so as to form a box of rectangular shape, the wall thickness of the cells visibly decreasing in the direction of penetration of the impacting object;

FIG. 12 illustrates schematically and in perspective, on the left of the figure, a unitary cell of generally hexagonal cross-section, intended to be associated with other similar cells so as to form a third particular embodiment of a sacrificial composite part, a first variant of which, in the form of a rectilinear beam, is shown on the right of the figure, formed by the association of a plurality of juxtaposed cells whose cross-section is generally hexagonal, and whose peripheral wall thickness decreases in the direction of penetration of the impacting object, as illustrated in the cross-sectional view of the unitary cell in the centre of the figure;

FIG. 13 schematically illustrates a cross-section of a second variant of the third embodiment of a sacrificial composite part of the invention, the latter comprising a plurality of rectilinear beams, one of which is shown in FIG. 12, so as to form a box of generally rectangular shape, the wall thickness of the cells visibly decreasing in the direction of penetration of the impacting object;

With reference to these drawings, the present invention relates to a sacrificial composite part 1, 10, 100 intended more particularly to absorb an optimised proportion, and as much as possible, of the energy released at the time of a collision of a vehicle with an impacting object 2, shown in FIG. 1, which may be generally cylindrical in shape, such as a tree or a post, although the impacting object 2 may be of any shape.

As its name indicates, the part 1, 10, 100 conforming to the present invention is intended to be the sacrificial element providing optimum safety for people and property positioned inside a vehicle undergoing a collision with an impacting object 2.

More specifically, the function of said sacrificial composite part 1, 10, 100 is to allow the damage resulting from the collision to be located outside the area of the vehicle that needs to be protected, while limiting the dynamic effects that people or objects in the impacted vehicle are likely to suffer.

Generally speaking, said sacrificial composite part 1, 10, 100 of the invention is composed of the assembly of a plurality of cells 3, 30, 300 consisting of elongated hollow structures defining a longitudinal axis 4, the latter being represented more particularly in FIG. 3.

Very preferably, the cells 3, 30, 300 of said part 1, 10, 100 of the invention are made from a composite material composed of reinforcing fibres embedded in a resin.

The implementation of a composite material is particularly interesting in the production of parts according to the invention. The way in which such a composite cell 3, 30, 300 crashes is through local destruction of the composite material under compression. This allows, on the one hand, to achieve high levels of loading, greater in particular than the bending stress used in the folding of metal walls and, on the other hand, to use up all the available penetration travel. For this point, the volume of material disintegrated by the penetration changed during the shock.

In the present invention, we seek more particularly to use these advantages of using a composite material, by associating them with three-dimensional shapes, described in more detail below, allowing the penetration force of an impacting body 2 to be controlled, the latter being in particular in the form of a cylindrical body.

The cells 3, 30, 300 can thus have a variable cross-section in a direction perpendicular to their longitudinal axis 4, and some preferred examples of embodiments of which, in particular round, square or hexagonal cross-section, will be described in more detail below in this description.

Each of the cells 3, 30, 300 which make up the assembly for obtaining the sacrificial composite part 1, 10, 100 of the invention comprises a peripheral wall 5, 50, 500 extending from a first end 6, 60, 600 of said cell 3, 30, 300, towards a second end 7, 70, 700, opposite said first end.

It should be noted that the present invention considers a direction of penetration 8 of the impacting object 2 into the vehicle, and therefore into the sacrificial composite part 1, 10, 100, this direction 8 being symbolised in the figures of the attached drawings by an arrow, which goes from said first end 6, 60, 600 towards said second end 7, 70, 700 of the cells 3, 30, 300 which make up said part 1, 10, 100.

According to a characteristic particular to the sacrificial composite part 1, 10, 100 of the present invention, the peripheral wall 5, 50, 500 of each of the cells 3, 30, 300, the assembly of which allows to constitute said part 1, 10, 100, has a thickness e decreasing along the longitudinal axis 4 of the hollow structure of each cell 3, 30, 300, in the direction of penetration 8, from the first end 6, 60, 600 towards the second end 7, 70, 700 of each of the cells 3, 30, 300.

Such a variation in the thickness e is shown in the accompanying figures, in some cases by means of dotted lines in the figures illustrating cells 3, 30, 300 in perspective, such a variation in thickness e being more particularly visible in FIGS. 1, 3, 11 and 13.

Even more specifically, it is possible to define a first thickness e1 of the first end 6, 60, 600 of the peripheral wall 5, 50, 500 of each of the cells 3, 30, 300, and a second thickness e2 of the second end 7, 70, 700 of said peripheral wall 5, 50, 500.

Said second thickness e2 is therefore less than said first thickness e1, and the thickness e of the peripheral wall 5, 50, 500 of each of the cells 3, 30, 300 varies, advantageously, linearly along the longitudinal axis 4 of said cell 3, 30, 300.

The first thickness e1 and the second thickness e2 of the peripheral wall of the cells, e1 being greater than e2, are shown more specifically in FIGS. 1 and 3 of the attached drawings.

Thanks to the variation in thickness e of the walls of the cells 3, 30, 300, decreasing from e1 to e2 along their longitudinal axis 4, in the direction of penetration 8 of the impacting object 2, the intersection of said cells 3, 30, 300 of the composite part 1, 10, 100 which is subjected to stress, in other words the cell wall surface in contact with the object 2, in the case of a flat impactor (not shown), reduces with the penetration.

When such a sacrificial composite part 1, 10, 100, is impacted by a cylindrical body 2, as illustrated in FIG. 1, the intersection between the cylindrical surface of the latter and said part 1 takes place with a contact cross-section S that changes little with the penetration. This can be explained by the fact that the reduction in cross-section of said part 1, 10, 100, due to the reduction in thickness e of the peripheral walls of the cells 3, 30, 300 of which it is composed, compensates for the increase in the impact area when it is sink in the direction 8.

In FIG. 1, the cylindrical impacting object 2 is shown in dotted lines, while the intersection between the cylindrical surface of said object 2 and the wall of the cells in the composite part 1 is shown in solid black lines.

As the composite material of the sacrificial part 1, 10, 100 collapses at a constant compressive stress, the force restored is then proportional to the contact cross-section, and therefore changes little, which allows to have a high coefficient of efficiency $\eta$, in other words a particularly high proportion of energy, which is released at the moment of collision, absorbed by the part of the invention 1, 10, 100.

Very preferably, in addition to the variation in the thickness e along the longitudinal axis 4 of the hollow structure of the cells 3, 30, 300, according to another advantageous particularities of the present invention, each of these cells 3, 30, 300 which make up the sacrificial composite part 1, 10, 100 has an internal cross-section, in a direction perpendicular to the longitudinal axis 4 of said cell 3, 30, 300, the surface of which increases from the first end towards said second end of said cell 3, 30, 300, in other words in the direction of penetration 8 of the impacting object 2.

Thus, in the example of embodiment which will be described in more detail below with reference to FIGS. 2 to 9, in which the cells 3 of the composite part 1 have a circular cross-section, the diameter of said cells 3 increases along the direction of penetration 8 of the impacting object 2 into said part 1.

In other words, the cells 3 can be generally conical, with a base, or root, corresponding to the second end 7 of the cells 3, of a larger diameter than that of the head, corresponding to the first end 6 of the cells 3.

This type of geometry is very easy to demould, allowing to manufacture a sacrificial composite box 1 with conical cells 3 at low cost.

In such an embodiment, the thickness e of the walls 5, 50, 500 of the cells 3, 30, 300 decreases from the head 6, 60, 600 to the root 7, 70, 700, this variation in thickness e being such that the cross-section S decreases with the penetration, which may be noted as x, in the direction 8. The reduced thickness e is compensated for at the root 7, 70, 700 by a larger surface area, in particular a larger diameter. As a result, the cross-sectional inertia increases with the value x, and this particularity allows to give the composite part 1, 10, 100 a good flexural hold. This prevents the breaks at the level of the second end 7, 70, 700, in the root area, particularly when the direction of impact is not perfectly axial.

With reference now to FIGS. 2 to 9, a first particular embodiment of a sacrificial composite part 1 according to the invention will be described below, formed by the association of a plurality of unitary cells 3, one of which is shown on the left-hand side of FIG. 2, with a substantially circular cross-section and whose peripheral wall 5, shown in dotted lines, has a thickness e decreasing from e1 to e2, e1>e2, in the direction 8 of penetration of the impacting object 2.

In this embodiment, each cell 3 of circular cross-section in the assembly is connected to at least one similar cell 3 adjacent to it by means of a connecting element 9 in the form of a partition, a part of which is shown in cross-section in the centre of FIG. 2, two cells 3 connected to each other by means of such a partition 9, and forming a module, being shown on the right-hand side of said figure.

The assembly of the cells 3 can be described as discontinuous, as said cells, which are round in cross-section, are not in direct contact with each other.

Very preferably, and as illustrated in particular on the right-hand side of FIG. 3, the thickness e' of the partition 9 connecting two adjacent cells 3 is, like the thickness e of the peripheral wall 5 of said cells 3, decreasing in the direction 8 of penetration of the impacting object 2 into the part 1.

Reference is now made to FIG. 4, which illustrates schematically and in perspective a first particular embodiment of a composite part 1 according to the invention, formed by the association of a plurality of unitary cells 3 whose cross-section is substantially circular, arranged, in a first variant, in the form of an elongate beam.

In this variant, two adjacent cells 3 are connected together by a connecting element consisting of a partition 9 with a thickness e' that preferably decreases in the direction 8, like the thickness e of the peripheral wall 5 of each cell 3, while, advantageously, the diameter of these cells 3 increases in this direction 8.

It should be noted that, according to the illustration shown in FIGS. 5 and 6, a connection mode similar to that described above for the conical cells 3 can be made in an orthogonal direction, which allows to manufacture sacrificial composite parts 1 of different lengths and widths, as required.

For example, a unitary cell 3 may comprise two portions of connecting element 9, 9' arranged in orthogonal directions, as illustrated on the left-hand side of FIG. 5, the thickness of the peripheral wall of the cell and of each portion of connecting element always decreasing in the direction of penetration 8 of the impacting object.

The combination of four of these unitary cells 3 can then be used to form a module, shown on the right of FIG. 5, made up of four of these cells 3 connected together, each cell 3 being connected to the two cells 3 adjacent to it by two connecting elements positioned in the orthogonal planes.

Thus, in a second variant of the first embodiment of the invention, it is possible to obtain a composite part 1 formed by the combination of a plurality of cells 2 whose cross-section is substantially round, arranged so as to form a rectangular box, as shown in FIG. 6, or a square box, whose length and width may vary.

In such a variant, each of the cells 3 comprises at least two, or even three or four, portions of connecting elements in the form of a partition, so as to allow said cell to be connected to two, three or four cells adjacent to it to form the rectangular box.

Advantageously, such shapes remain perfectly demouldable, which allows to envisage a production in simple moulds, and therefore, ultimately, an economical production.

Preferably, a sole 11 can be added to the sacrificial composite part 1 in the lower part of said part 1, considering the direction of penetration 8 of the impacting object, in other words a sole 11 positioned at the level of the second end 7 of the cells 3 that make up the composite part 1.

FIG. 7 shows a sacrificial composite part in the form of an elongated beam comprising such a rectangular-shaped lower sole 11.

However, a composite part 1 in the form of a rectangular box as shown in FIG. 6 can also advantageously comprise such a lower sole 11.

The presence of a lower sole 11 can allow a composite part 1 comprising it to be interfaced.

Preferably, the sacrificial composite part 1 of the invention may incorporate a connecting bar 12 overhanging the cells 3.

The presence of such an element will advantageously increase the impact resistance for a very low penetration of the impacting object 2.

According to the example shown in FIG. 8, such a connecting bar 12 may take the form of a plurality of annulus arranged linearly side by side, with one annulus of the connecting bar overhanging a cell 3, or it may take the form of a rectangular wall, as shown in FIG. 9.

A sacrificial composite part 1, 10, 100 according to the present invention, whatever the chosen embodiment, particularly with regard to the arrangement of the cells 3, 30, 300 and the cross-section thereof, may comprise a lower sole 11 and/or a connecting bar 12 overhanging said cells 3, 30, 300 which make up said part 1, 10, 100.

In the case where the composite part 1, 10, 100 comprises both a lower sole 11 and a connecting bar 12 for connecting the cells, a considerable flexural strengthening of said part 1, 10, 100 thus constituted is observed.

A second particular embodiment of a sacrificial composite part 10 in accordance with the invention, illustrated in FIGS. 10 and 11, can be produced by assembling unitary cells 30 with a generally square cross-section.

Thus, as shown, each of the cells 30 can be parallelepipedal, while having an internal shape proposing a longitudinal reduction in the thickness of the peripheral wall 50 in the direction of penetration 8 of the impacting object 2, as is more particularly illustrated in the cross-sectional views of the central part of FIG. 10 and FIG. 11.

In a first variant of this second embodiment, the sacrificial composite part 10, shown on the right in FIG. 10, can take the form of a rectilinear beam, formed by the combination of a plurality of cells 30, of square cross-section, juxtaposed continuously.

In a second variant of this second embodiment, illustrated in FIG. 11, the sacrificial composite part 10 comprises a plurality of rectilinear beams, one of which is shown in FIG. 10, so as to form a box of rectangular shape, the length and the width of which may be variable and adapted according to the use of said part 10, the wall thickness of the cells 30 decreasing from the first end 60 towards the second end 70, while, advantageously, the internal cross-sectional surface area of the cells 30 increases from said first end 60 towards said second end 70.

Here again, in this embodiment, the demouldability of the shape remains.

A third particular embodiment of a sacrificial composite part 100 conforming to the invention, illustrated in FIGS. 12 and 13, can be made from the assembly of unitary cells 300 whose cross-section is hexagonal.

Thus, as shown, it is possible to produce a sacrificial composite part in the form of a “honeycomb”, while having an internal shape proposing a longitudinal reduction in the thickness of the peripheral wall 500 in the direction of penetration 8 of the impacting object 2, as is more particularly illustrated in the cross-sectional views of the central part of FIG. 12 and FIG. 13.

In a first variant of this third embodiment, the sacrificial composite part 100, shown on the right-hand side of FIG. 10, can take the form of a rectilinear beam, formed by the combination of a plurality of cells 300, hexagonal in cross-section, juxtaposed continuously.

In a second variant of this third embodiment, illustrated in FIG. 13, the sacrificial composite part 100 comprises a plurality of rectilinear beams, one of which is shown in FIG. 12, so as to form a rectangular box whose length and width can be varied and adapted according to the use of said part 100. As in the first two embodiments described, the wall thickness of the cells 300 decreases from the first end 600 towards the second end 700, while advantageously the surface area of the internal hexagonal cross-section of the cells 300 increases from said first end 600 towards said second end 700.

The invention claimed is:

1. A sacrificial composite part that absorbs the energy released when a vehicle collides with an impacting object, said part consisting of an assembly of a plurality of cells having a circular cross-section, each cell comprising a peripheral wall connecting a first end and a second end of said cell, the direction of penetration of the impacting object into said part extending from said first end towards said second end, said part being characterized in that the peripheral wall of each cell has a thickness decreasing from said first end towards said second end of said cell, in the direction of penetration of the impacting object, wherein each cell is connected to at least one adjacent cell by a connecting element in the form of a partition, the thickness of which decreasing in the direction of penetration of the impacting object.

2. The sacrificial composite part according to claim 1, characterized in that each of the cells of which it is composed has an internal cross-section whose surface area increases from said first end towards said second end of said cell, in the direction of penetration of the impacting object.

3. The sacrificial composite part according to claim 1, characterized in that it comprises a lower sole considering the direction of penetration of the impacting object.

4. The sacrificial composite part according to claim 1, characterized in that it comprises a connecting bar overhanging the cells as viewed in the direction of penetration of the impacting object.

5. The sacrificial composite part according to claim 2, characterized in that it comprises a lower sole considering the direction of penetration of the impacting object.

6. The sacrificial composite part according to claim 2, characterized in that it comprises a connecting bar overhanging the cells as viewed in the direction of penetration of the impacting object.

* * * * *